United States Patent
Parrott et al.

(10) Patent No.: US 10,104,333 B2
(45) Date of Patent: Oct. 16, 2018

(54) VECTOR DATA CONVERSION OUTPUT DEVICE, VECTOR DATA CONVERSION OUTPUT METHOD, AND VECTOR DATA CONVERSION OUTPUT PROGRAM

(75) Inventors: Jason Parrott, Tokyo-to (JP); Yota Hisamichi, Tokyo (JP)

(73) Assignee: GREE, INC., Tokyo (JP)

( * ) Notice: Subject to any disclaimer, the term of this patent is extended or adjusted under 35 U.S.C. 154(b) by 269 days.

(21) Appl. No.: 14/123,279

(22) PCT Filed: Jun. 1, 2012

(86) PCT No.: PCT/JP2012/003637
§ 371 (c)(1),
(2), (4) Date: Dec. 2, 2013

(87) PCT Pub. No.: WO2012/164959
PCT Pub. Date: Dec. 6, 2012

(65) Prior Publication Data
US 2014/0098290 A1    Apr. 10, 2014

(30) Foreign Application Priority Data

Jun. 2, 2011    (JP) .................................. 2011-124607
Jun. 2, 2011    (JP) .................................. 2011-124609

(51) Int. Cl.
*G06T 11/40*    (2006.01)
*G06T 11/20*    (2006.01)
(Continued)

(52) U.S. Cl.
CPC ............... *H04N 7/01* (2013.01); *G06T 11/40* (2013.01); *G06T 9/20* (2013.01); *G06T 11/20* (2013.01)

(58) Field of Classification Search
CPC ....... H04N 7/01; G06T 17/00; G06T 2210/00; G06T 11/40; G06T 9/20
(Continued)

(56) References Cited

U.S. PATENT DOCUMENTS 5,611,037 A * 3/1997 Hayashi .................. G06T 11/00
                                                    345/442
7,999,805 B2 * 8/2011 Whatmough ............. G06T 9/00
                                                    345/418
(Continued)

FOREIGN PATENT DOCUMENTS

JP       A-7-85123       3/1995
JP       A-9-245180      9/1997
(Continued)

OTHER PUBLICATIONS

International Search Report issued in International Patent Application No. PCT/JP2012/003637 dated Aug. 14, 2012.
(Continued)

*Primary Examiner* — Chante Harrison
(74) *Attorney, Agent, or Firm* — Oliff PLC

(57) ABSTRACT

In order for an electronic device not equipped with FLASH playback software to reproduce SWF format vector data, the present invention provides a connection search unit that searches for a connection between terminal points of line segments forming SWF format vector data, searching being performed for each fill style pertaining to the line segments; an confined space determination control unit that determines whether line segments determined to be connected form an confined space, and when the line segments form an confined space, establishes the line segments as line segments of the confined space and the fill style pertaining to the line segments as a fill style of the confined space; and a vector
(Continued)

data output unit that outputs vector data based on the line segments and the fill style established for the confined space.

6 Claims, 18 Drawing Sheets

(51) Int. Cl.
*G06T 9/20* (2006.01)
*H04N 7/01* (2006.01)

(58) Field of Classification Search
USPC .................. 345/418, 619, 426, 589; 348/441
See application file for complete search history.

(56) References Cited

U.S. PATENT DOCUMENTS

| | | | | |
|---|---|---|---|---|
| 2002/0145616 | A1* | 10/2002 | Doan | G06T 11/40 345/629 |
| 2003/0023347 | A1 | 1/2003 | Konno et al. | |
| 2004/0207626 | A1* | 10/2004 | Li | G06T 11/40 345/441 |
| 2004/0234140 | A1 | 11/2004 | Nonaka | |
| 2005/0206653 | A1* | 9/2005 | Beaumont | G06T 11/40 345/629 |
| 2006/0082596 | A1* | 4/2006 | Karlov | G06T 11/40 345/629 |
| 2007/0236499 | A1* | 10/2007 | Mihara | G06T 11/40 345/441 |
| 2008/0291294 | A1 | 11/2008 | Cha | |
| 2009/0040230 | A1* | 2/2009 | Kurokawa | G06T 11/40 345/441 |
| 2009/0115867 | A1* | 5/2009 | Ishida | G06T 7/0085 348/222.1 |
| 2009/0184966 | A1* | 7/2009 | Perani | G06T 11/40 345/442 |
| 2010/0149091 | A1* | 6/2010 | Kota | G06T 11/00 345/156 |
| 2010/0149189 | A1* | 6/2010 | Kota | G06T 11/20 345/418 |
| 2010/0149215 | A1* | 6/2010 | Kota | G09G 5/363 345/619 |
| 2010/0271397 | A1* | 10/2010 | Feldstein | G06T 11/40 345/646 |
| 2010/0283780 | A1* | 11/2010 | Ohmori | G06T 15/20 345/419 |

FOREIGN PATENT DOCUMENTS

| | | |
|---|---|---|
| JP | A-2002-15329 | 1/2002 |
| JP | A-2002-92626 | 3/2002 |
| JP | 2002-103258 A | 4/2002 |
| JP | A-2004-46513 | 2/2004 |
| JP | A-2004-356998 | 12/2004 |
| JP | A-2006-344134 | 12/2006 |
| JP | A-2007-265397 | 10/2007 |
| JP | 2010-066789 A | 3/2010 |
| JP | A-2010-244206 | 10/2010 |
| JP | A-2012-150756 | 8/2012 |

OTHER PUBLICATIONS

Sep. 2, 2014 Office Action issued in Japanese Application No. 2014-125366.

Yoshioka, "An Introduction to Flash for Programmers vol. 4," Nikkei Software, Japan, Nikkei Business Publications, Inc., Jun. 24, 2004, vol. 7(vii), pp. 126-131.

Yoshioka, "Part 2, A First Step for Making a Flash Movie," Nikkei Software, Japan, Nikkei Business Publications, Inc., Oct. 24, 2003, vol. 6(XI), pp. 80-84.

Mar. 3, 2015 Office Action issued in Japanese Application No. 2014-257592.

Office Action issued in Japanese Patent Application No. 2011-124607 dated Dec. 3, 2013 (with translation).

Office Action issued in Japanese Patent Application No. 2011-124609 dated Dec. 3, 2013 (with translation).

* cited by examiner

FIG. 3

SWF vector data 201

| Line segment number | Starting point | Ending point | First fill style | Second fill style |
|---|---|---|---|---|
| 1 | (1,0) | (0,0) | 1 | 0 |
| 2 | (1,2) | (0,3) | 0 | 2 |
| 3 | (1,0) | (1,1) | 1 | 0 |
| 4 | (0,1) | (0,0) | 1 | 0 |
| 5 | (1,4) | (1,2) | 0 | 2 |
| 6 | (0,3) | (1,4) | 0 | 2 |
| 7 | (1,1) | (0,1) | 1 | 0 |

FIG. 4

| Line segment number | First terminal point | Second terminal point | Fill style | Finalized flag |
|---|---|---|---|---|
| 1 | (1,0) | (0,0) | 1 | Non-finalized |
| 3 | (1,0) | (1,1) | 1 | Non-finalized |
| 4 | (0,1) | (0,0) | 1 | Non-finalized |
| 7 | (1,1) | (0,1) | 1 | Non-finalized |

202

| Line segment number | First terminal point | Second terminal point | Fill style | Finalized flag |
|---|---|---|---|---|
| 2 | (1,2) | (0,3) | 2 | Non-finalized |
| 5 | (1,4) | (1,2) | 2 | Non-finalized |
| 6 | (0,3) | (1,4) | 2 | Non-finalized |

203

FIG. 5
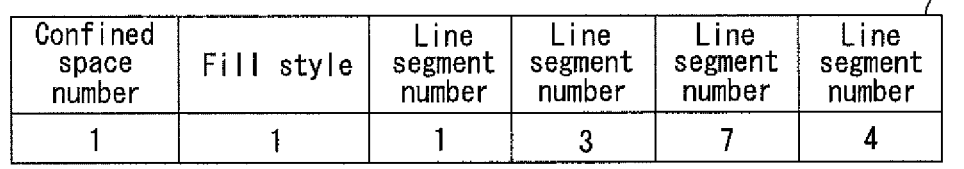
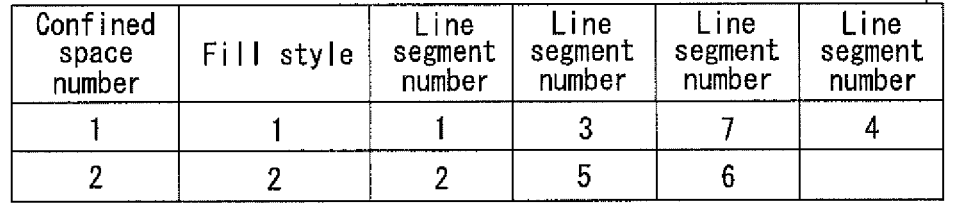

FIG. 7

SWF vector data — 211

| Line segment number | Starting point | Ending point | First fill style | Second fill style |
|---|---|---|---|---|
| 1 | (1,0) | (0,0) | 1 | 0 |
| 2 | (1,0) | (1,1) | 1 | 0 |
| 3 | (1,1) | (0,1) | 1 | 0 |
| 4 | (0,1) | (0,0) | 1 | 0 |
| 5 | (0.75,0.25) | (0.25,0.25) | 0 | 1 |
| 6 | (0.75,0.25) | (0.75,0.75) | 0 | 1 |
| 7 | (0.75,0.75) | (0.25,0.75) | 0 | 1 |
| 8 | (0.25,0.75) | (0.25,0.25) | 0 | 1 |

FIG. 8

| Line segment number | First terminal point | Second terminal point | Fill style | Finalized flag |
|---|---|---|---|---|
| 1 | (1,0) | (0,0) | 1 | Non-finalized |
| 2 | (1,0) | (1,1) | 1 | Non-finalized |
| 3 | (1,1) | (0,1) | 1 | Non-finalized |
| 4 | (0,1) | (0,0) | 1 | Non-finalized |
| 5 | (0.75,0.25) | (0.25,0.25) | 1 | Non-finalized |
| 6 | (0.75,0.25) | (0.75,0.75) | 1 | Non-finalized |
| 7 | (0.75,0.75) | (0.25,0.75) | 1 | Non-finalized |
| 8 | (0.25,0.75) | (0.25,0.25) | 1 | Non-finalized |

212

213

| space number | Fill style | Line segment number | Line segment number | Line segment number | Line segment number |
|---|---|---|---|---|---|
| 1 | 1 | 1 | 2 | 3 | 4 |

214

| space number | Fill style | Line segment number | Line segment number | Line segment number | Line segment number |
|---|---|---|---|---|---|
| 1 | 1 | 1 | 2 | 3 | 4 |
| 2 | 1 | 5 | 6 | 7 | 8 |

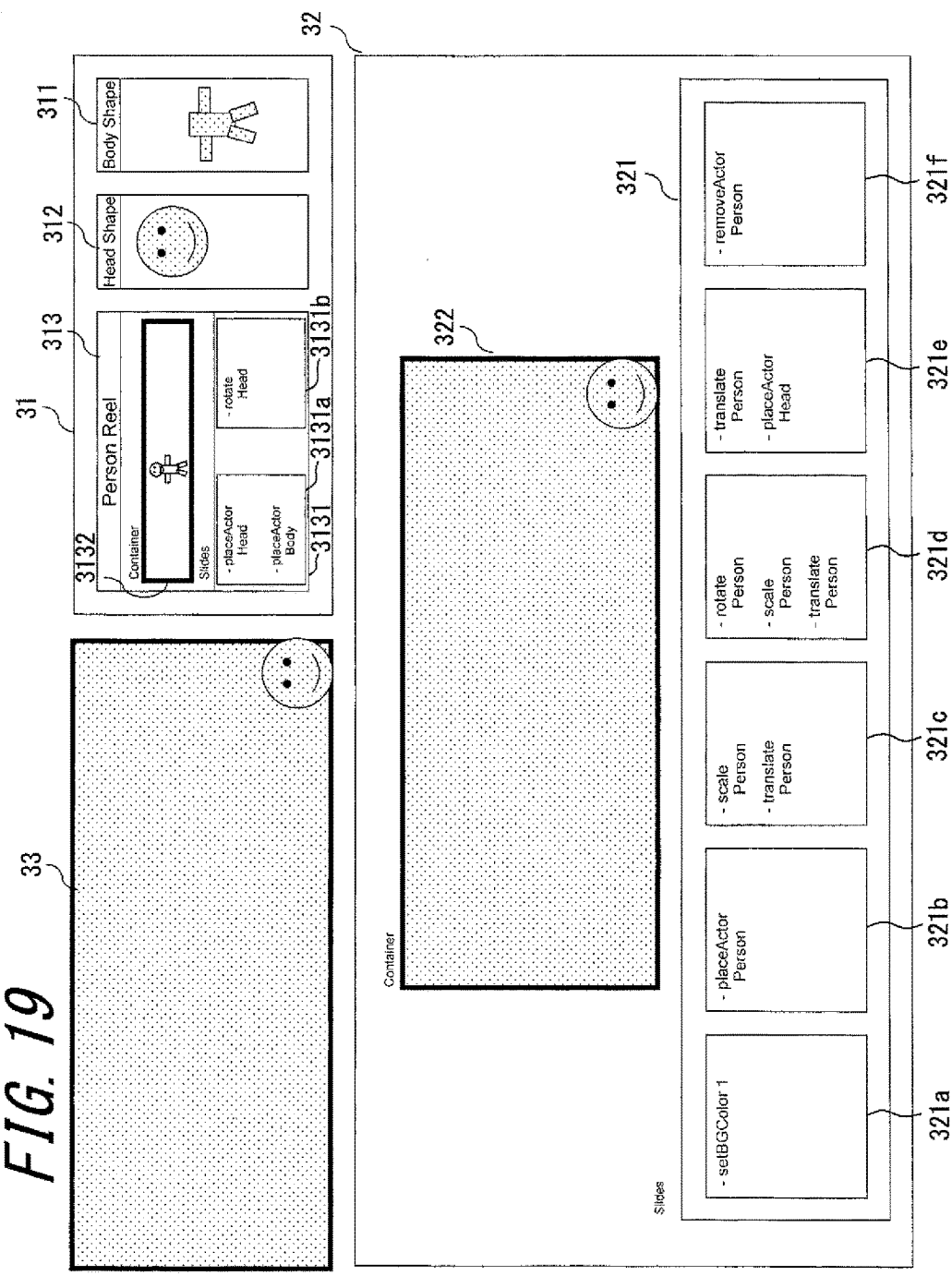

VECTOR DATA CONVERSION OUTPUT DEVICE, VECTOR DATA CONVERSION OUTPUT METHOD, AND VECTOR DATA CONVERSION OUTPUT PROGRAM

CROSS-REFERENCE TO RELATED APPLICATION

This application claims priority to and the benefit of Japanese Patent Application No. 2011-124607 filed Jun. 2, 2011 and Japanese Patent Application No. 2011-124609 filed Jun. 2, 2011, the entire contents of which are incorporated herein by reference.

TECHNICAL FIELD

The present invention relates to a vector data conversion output device, vector data conversion output method, and vector data conversion output program.

BACKGROUND ART

In recent years, still images and video content are widely provided using FLASH on various types of webpages (JP2004356998A (PTL 1)). Image data rendered with FLASH is described in Small Web Format (SWF), which consists of vector data. An original format is used for SWF format vector data. Specifically, SWF format vector data specifies video data with a plurality of line segments, the starting point (MoveTo) and ending point (LineTo) of each line segment, and the fill styles (Fillstyle) to the left and right of each line segment. The fill style refers to a pattern for filling space, such as filling with a pale color.

CITATION LIST

Patent Literature

PTL 1: JP2004356998A

SUMMARY OF INVENTION

Technical Problem

In the standard format for the canvas and for a variety of drawing software applications, however, vector data is specified by a plurality of connected line segments and by the fill style of the space confined by the connected line segments (referred to below as "confined space"). No method has been proposed for associating these various formats, and therefore SWF format vector data cannot be reproduced on an electronic device not equipped with FLASH playback software. Furthermore, when vector data is placed and stored frame by frame during the display of video data, a large processing burden is placed on the processing unit.

The present invention addresses the above problems by providing a vector data conversion output device, vector data conversion output method, and vector data conversion output program that, for an electronic device not equipped with FLASH playback software, allow for output of vector data and allow for output of video data with a reduced processing load by converting the SWF format vector data to a standard format.

Solution to Problem

In order to resolve the above problems, a vector data conversion output device according to the present invention is a vector data conversion output device for retrieving SWF format vector data and outputting converted vector data, including: a vector data retrieving unit configured to retrieve SWF format vector data; a connection search unit configured to search for a connection between terminal points of a plurality of line segments forming the SWF format vector data, searching being performed for each fill style pertaining to the line segments; an confined space determination control unit configured to determine whether a plurality of line segments determined by the connection search unit to be connected form an confined space, and when the line segments form an confined space, to establish the line segments as line segments of the confined space and the fill style pertaining to the line segments as a fill style of the confined space; and a vector data output unit configured to output vector data based on the line segments established for the confined space and the fill style established for the confined space.

In the vector data conversion output device according to the present invention, when the confined space determination control unit determines that a plurality of confined spaces are formed, the confined spaces are in overlap, and the fill styles of the confined spaces are the same, the vector data output unit may further output a combination, by exclusive or, of the fill styles of overlapping portions of the confined spaces.

Another vector data conversion output device according to the present invention is a vector data conversion output device for retrieving and outputting vector data, including: an image memory configured to store each of a plurality of image elements forming the vector data; a video control unit configured to control translation, rotation, and/or scaling of each of the image elements; and a video output unit configured to output, at predetermined time intervals, vector data formed by a combination of the image elements after the translation, rotation, and/or scaling.

A vector data conversion output method according to the present invention is a vector data conversion output method for retrieving SWF format vector data and outputting converted vector data, including the steps of: retrieving SWF format vector data; searching for a connection between terminal points of a plurality of line segments forming the SWF format vector data, the searching being performed for each fill style pertaining to the line segments; determining whether a plurality of line segments determined in the searching step to be connected form an confined space, and when the line segments form an confined space, establishing the line segments as line segments of the confined space and the fill style pertaining to the line segments as a fill style of the confined space; and outputting vector data based on the line segments established for the confined space and the fill style established for the confined space.

In the vector data conversion output method according to the present invention, when a plurality of confined spaces are determined to be formed in the determining step, the confined spaces are in overlap, and the fill styles of the confined spaces are the same, the output step may further include outputting a combination, by exclusive or, of the fill styles of overlapping portions of the confined spaces.

Another vector data conversion output method according to the present invention is a vector data conversion output method for retrieving and outputting vector data, including the steps of: storing each of a plurality of image elements forming the vector data in memory; controlling translation, rotation, and/or scaling of each of the image elements; and outputting, at predetermined time intervals, vector data formed by a combination of the image elements after the translation, rotation, and/or scaling in the conversion step.

A vector data conversion output program according to the present invention is a vector data conversion output program for causing a computer that retrieves SWF format vector data and outputs converted vector data to perform the steps of: retrieving SWF format vector data; searching for a connection between terminal points of a plurality of line segments forming the SWF format vector data, the searching being performed for each fill style pertaining to the line segments; determining whether a plurality of line segments determined to be connected form an confined space, and when the line segments form an confined space, establishing the line segments as line segments of the confined space and the fill style pertaining to the line segments as a fill style of the confined space; and outputting vector data based on the line segments established for the confined space and the fill style established for the confined space.

In the vector data conversion output program according to the present invention, when a plurality of confined spaces are determined to be formed in the determining step, the confined spaces are in overlap, and the fill styles of the confined spaces are the same, the output step may further include outputting a combination, by exclusive or, of the fill styles of overlapping portions of the confined spaces.

Another vector data conversion output program according to the present invention is a vector data conversion output program for causing a computer that retrieves and outputs vector data to perform the steps of: storing each of a plurality of image elements forming the vector data in memory; controlling translation, rotation, and/or scaling of each of the image elements; and outputting, at predetermined time intervals, vector data formed by a combination of the image elements after the translation, rotation, and/or scaling in the conversion step.

Advantageous Effect of Invention

According to the above structure, the vector data conversion output device, vector data conversion output method, and vector data conversion output program of the present invention allow an electronic device not equipped with FLASH playback software to output video by converting SWF format vector data to a standard format.

BRIEF DESCRIPTION OF DRAWINGS

The present invention will be further described below with reference to the accompanying drawings, wherein:

FIG. 3 represents SWF format vector data in Embodiment 1 of the present invention;

FIG. 4 illustrates line segment lists in Embodiment 1 of the present invention;

FIG. 5 illustrates confined space lists in Embodiment 1 of the present invention;

FIG. 7 represents SWF format vector data in Embodiment 1 of the present invention;

FIG. 8 illustrates line segment lists in Embodiment 1 of the present invention;

FIG. 19 is a conceptual diagram of video memory in Embodiment 2 of the present invention.

DESCRIPTION OF EMBODIMENTS

The following describes embodiments of the present invention.

Embodiment 1

1.1 Structure of Vector Data Conversion Output Device

Figure 1:
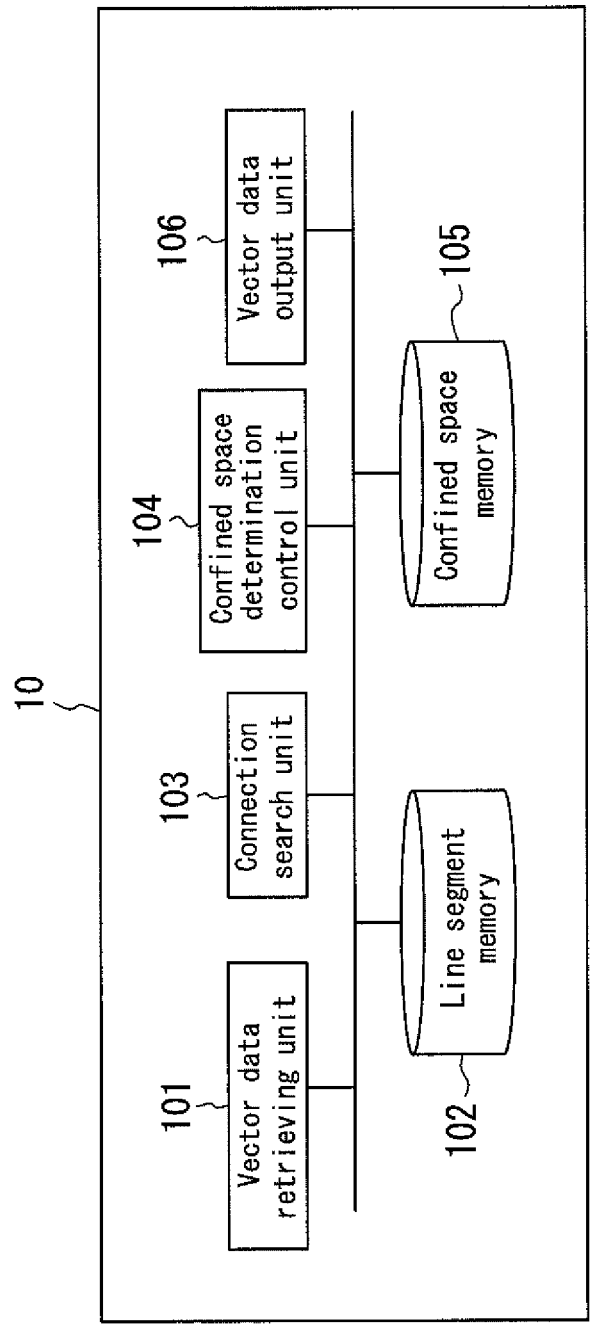
FIG. 1 is a block diagram representing the structure of Embodiment 1 of the present invention.

FIG. 1 is a block diagram illustrating the structure of a vector data conversion output device in Embodiment 1 of the present invention. As illustrated in FIG. 1, a vector data conversion output device 10 in Embodiment 1 of the present invention includes a vector data retrieving unit 101, a line segment memory 102, a connection search unit 103, an confined space determination control unit 104, an confined space memory 105, and a vector data output unit 106.

The vector data retrieving unit 101 preferably retrieves SWF format vector data from a website or the like. The source of retrieving is not limited to a website, however, and SWF format vector data stored on a hard disk (not illustrated) provided in the vector data conversion output device 10 may be retrieved. Note that "SWF format" is a format composed of a plurality of pieces of line segment data, with each piece of line segment data specifying a starting point, an ending point, and the fill styles to the left and right of the line segment. Therefore, the SWF format includes vector data in SWF format as well as all vector data formats equivalent to SWF format.

The line segment data in the SWF format vector data retrieved by the vector data retrieving unit 101 is classified by the fill styles of the line segment data and stored as a line segment list in the line segment memory 102. The line segment list stores coordinates of the two terminal points and the values of the fill styles for each line segment.

The connection search unit 103 searches for connection relationships between line segments in the line segment list stored in the line segment memory 102. A connection relationship is searched for by comparing the coordinates of the terminal points of each line segment.

The confined space determination control unit 104 determines whether a combination of line segments for which the connection search unit 103 found a connection forms an confined space with a fill style.

A combination of pieces of line segment data determined by the confined space determination control unit 104 to form an confined space is stored in the confined space memory 105 in an confined space list.

The vector data output unit 106 outputs vector data based on the confined space list stored in the confined space memory 105.

A computer may be suitably used to function as the vector data conversion output device 10. Such a computer has a program describing processes for achieving the functions of the vector data conversion output device 10 stored in a memory unit of the computer and achieves these functions by the Central Processing Unit (CPU) of the computer reading and executing the program.

1.2 Operations of Vector Data Conversion Output Device 10

Figure 2:
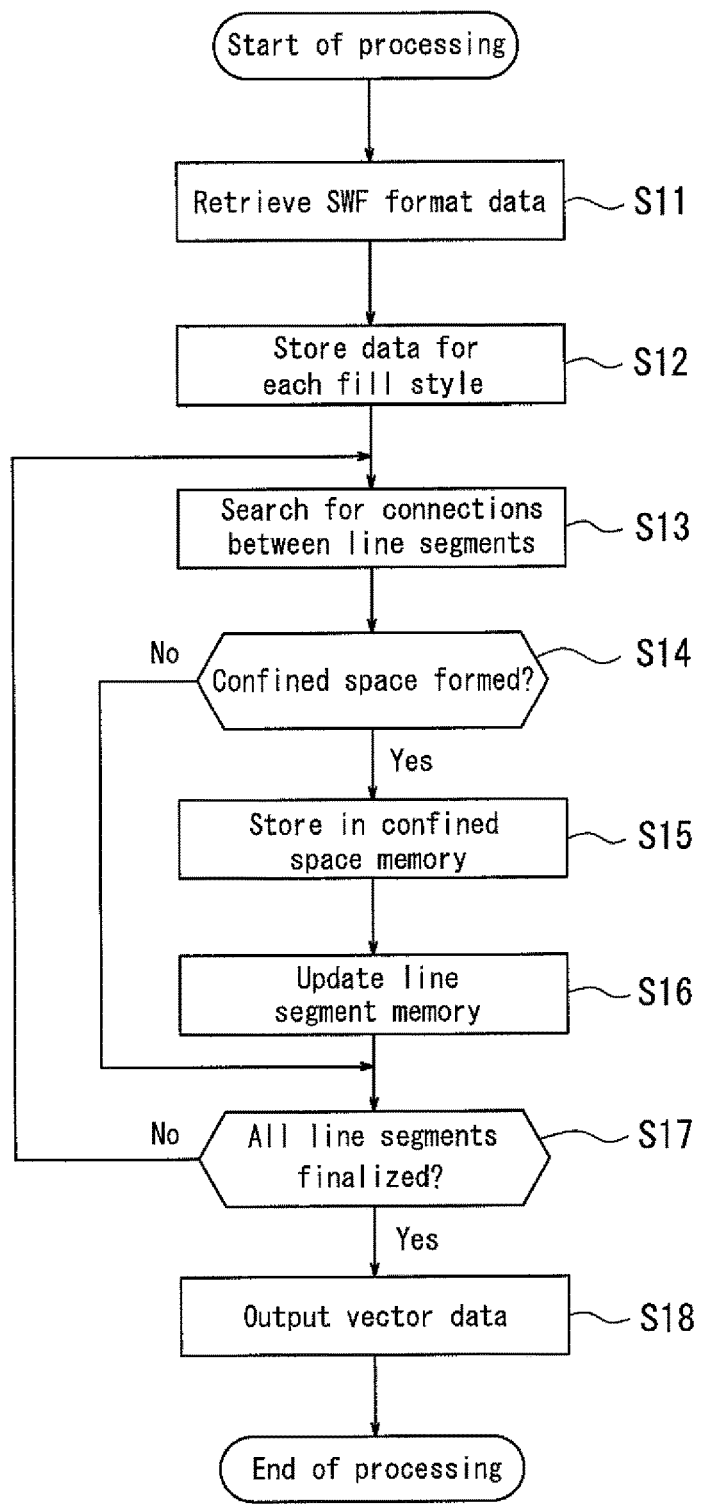
FIG. 2 is a flowchart representing operations of Embodiment 1 of the present invention.

FIG. 2 is a flowchart of operations by which the vector data conversion output device 10 retrieves SWF vector data and outputs vector data. The following describes an example of outputting representative SWF vector data.

1.2.1 Output Operations of Vector Data Conversion Output Device 10 for SWF Vector Data in FIG. 3

First, an example is described in which the vector data conversion output device 10 retrieves SWF vector data 201 illustrated in FIG. 3 and outputs converted vector data.

First, the vector data retrieving unit 101 preferably retrieves the SWF format vector data in FIG. 3 from a website or the like (step S11). As illustrated in FIG. 3, the SWF format vector data includes, for each line segment, coordinates of the starting point of the line segment (x coordinate and y coordinate), coordinates of the ending point of the line segment, a first fill style for the line segment (fill style for the right side of the line segment), and a second fill style for the line segment (fill style for the left side of the line segment).

Fill style "1" indicates the filling of space with a predetermined pattern, fill style "2" indicates the filling of space with a different predetermined pattern, and fill style "0" indicates no filling of space.

The source from which the vector data retrieving unit 101 retrieves vector data is not limited to a website, and SWF format vector data stored in a memory unit or the like (not illustrated) provided in the vector data conversion output device 10 may be retrieved.

Next, the vector data conversion output device 10 classifies the line segment data in the retrieved SWF format vector data by the fill styles of the line segment data and stores the line segment data in the line segment memory 102 for each fill style (step S12).

FIG. 4 illustrates line segment data stored in the line segment memory 102. The line segment data is preferably stored as a line segment list classified by fill style. In FIG. 4, a line segment list 202 for fill style "1" and a line segment list 203 for fill style "2" are stored. As information on each line segment, a line segment number, the two terminal points of the line segment, the fill style, and a finalized flag are stored in the line segment list 202 and the line segment list 203. In the description of the first terminal point and second terminal point in the present example, the starting point of the SWF format line segment data is stored as the first terminal point, and the ending point of the SWF format line segment data is stored as the second terminal point. Alternatively, however, the ending point of the SWF format line segment data may be stored as the first terminal point, and the starting point of the SWF format line segment data may be stored as the second terminal point. The finalized flag is set to "finalized" when a line segment has been finalized as a line segment forming an confined space and is set to "non-finalized" when not finalized. This flag is used to search for a connection. Note that in FIG. 4, the case is described in which the line segment memory 102 includes only line segment data for which just one of the first fill style and the second fill style is a value other than "0", yet the line segment memory 102 may include line segment data for which both the first fill style and the second fill style are a value other than "0". For example, when line segment data for which the first fill style is "1" and the second fill style is "2" is included, such line segment data is stored both in the line segment list 202 and the line segment list 203 in FIG. 4. Furthermore, when line segment data for which both the first fill style and the second fill style are "1", for example, is included, such line segment data is stored as two pieces of data in the line segment list 202 in FIG. 4. In other words, two entries having "the line segment number of the line segment, two terminal points, the fill style ("1"), and the finalized flag" are created in the line segment list 202.

Next, for each line segment list, the connection search unit 103 searches for connections between line segments and extracts line segments (referred to below as "elemental line segments") forming a certain graphic (including graphics forming an confined space and not forming an confined space) (step S13). Specifically, the connection search unit 103 compares the coordinates of the terminal points of a line segment in a line segment list with the coordinates of the terminal points of the other line segments included in the line segment list and determines that the line segment is connected to another line segment at a terminal point when the respective coordinates match. The identical coordinates in this case are referred to as a connection point. When the line segment for which the connection search unit 103 is searching for a connection matches a terminal point of any line segment previously extracted during the searching process, the connection search unit 103 stops searching for a connection for the line segment.

The following describes operations of the connection search unit 103 for determining the connection relationships in the line segment list 202 and the line segment list 203 illustrated in FIG. 4. First, the connection search unit 103 selects the line segment that is stored highest in the line segment list and has a finalized flag of "non-finalized" (line segment with line segment number "1") as a first elemental line segment and searches for a connection relationship with another line segment for the coordinates (1,0) of the first terminal point of the first elemental line segment. The other line segments targeted for the determination of a connection relationship are the pieces of line segment data for which the finalized flag is "non-finalized" in the line segment list 202. The comparison of coordinates is performed in order from the top of the line segment list 202. The above coordinates are identical to the coordinates (1,0) of the first terminal point of line segment number "3". Accordingly, the connection search unit 103 determines that the line segments with line segment number "1" and line segment number "3" are connected and extracts the line segment with line segment number "3" as a second elemental line segment. Below, the connection point between the first elemental line segment and the second elemental line segment (in this case, the coordinates (1,0)) is referred to as a starting connection point. Note that in the search for a connection relationship between a given line segment and another line segment, both the first terminal point and the second terminal point of the other line segment are candidates for connection points between the given line segment and the other line segment. The same also holds for the connection searching process below.

Next, the connection search unit 103 searches for coordinates that are the same as the coordinates (1,1) of the other terminal point, i.e. the second terminal point, of line segment number "3" extracted as the second elemental line segment. These coordinates are identical to the coordinates (1,1) of the first terminal point of line segment number "7". Accordingly, the connection search unit 103 determines that the line segments with line segment number "1" and line segment number "7" are connected and extracts the line segment with line segment number "7" as a third elemental line segment.

The connection search unit 103 then searches for coordinates that are the same as the coordinates (0,1) of the other terminal point, i.e. the second terminal point, of line segment number "7" extracted as the third elemental line segment. These coordinates are identical to the coordinates (0,1) of the first terminal point of line segment number "4". Accordingly, the connection search unit 103 determines that the line segments with line segment number "7" and line segment number "4" are connected and extracts the line segment with line segment number "4" as a fourth elemental line segment.

The connection search unit 103 then searches for coordinates that are the same as the coordinates (0,0) of the other terminal point, i.e. the second terminal point, of line segment number "4" extracted as the fourth elemental line segment. These coordinates are identical to the coordinates (0,0) of the second terminal point of line segment number "1". Accordingly, the connection search unit 103 determines that the line segments with line segment number "4" and line segment number "1" are connected. When the coordinates match a terminal point of any elemental line segment previously extracted during the process of searching for a connection relationship, or when the coordinates do not match any terminal point in the line segment list, the connection search unit 103 stops searching for a connection for the line segment. In this example, since the coordinates of the second terminal point of the fourth elemental line segment (line segment number "4") match the coordinates of the second terminal point of the previously extracted first elemental line segment (line segment number "1"), the connection search unit 103 stops searching for a connection.

After the connection search unit 103 has stopped searching for a connection, the confined space determination control unit 104 determines whether a combination of line segments for which a connection was found forms an confined space (step S14). The confined space determination control unit 104 examines the terminal points of the line segment for which the connection search unit 103 started the determination of elemental line segments (the first elemental line segment). When the connection searching ended on the terminal point that was not the starting connection point, the combination of line segments is determined to form an confined space. Otherwise, the confined space determination control unit 104 determines that the combination does not form an confined space. In the present example, the starting connection point of the first elemental line segment (line segment number "1") for which the connection search unit 103 started the determination is (1,0). The coordinates for which the determination ended are those of the other terminal point (0,0) of the line segment number "1". Accordingly, the confined space determination control unit 104 determines that the combination of the first elemental line segment (line segment number "1"), the second elemental line segment (line segment number "2"), the third elemental line segment (line segment number "3"), and the fourth elemental line segment (line segment number "4") forms an confined space, and processing proceeds to step S15. Conversely, when the confined space determination control unit 104 determines that the combination of line segments does not form an confined space, processing proceeds to step S17.

The confined space determination control unit 104 then stores the combination of pieces of line segment data determined to form an confined space in the confined space memory 105 (step S15).

FIG. 5 illustrates an confined space list 204 stored in the confined space memory 105. The confined space list 204 stores an "confined space number", which is a serial number for the confined space, a "fill style", and the line segment numbers determined to be connected, which are stored in the order of connection. Specifically, the line segment numbers "1", "3", "7", and "4" are connected in this order as the confined space for fill style "1" and are stored as illustrated in FIG. 5. The stored vector data is thus in the same format as the standard format for the canvas and for a variety of drawing software applications, since the vector data is specified by a plurality of continuous line segments and by the fill style of the confined space closed in by the connected line segments.

For the line segment data pertaining to the confined space, the confined space determination control unit 104 then updates the finalized flag to "finalized" in the line segment list stored in the line segment memory 102 (step S16). In other words, the confined space determination control unit 104 updates the finalized flag to "finalized" for all of the line segment numbers "1", "3", "7", and "4".

The connection search unit 103 then refers to the finalized flags in the line segment list stored the line segment memory 102 to determine whether all of the finalized flags are set to "finalized" (step S17). If not all of the finalized flags are set to "finalized", the processing from step S13 to step S17 is repeated until all are set to "finalized". In the present example, all of the finalized flags are set to "finalized" in the line segment list 202, but not in the line segment list 203, and therefore processing proceeds to step S13.

Next, the connection search unit 103 searches for connections in all of the line segments the line segment list 203 (step S13). The connection search unit 103 selects the first line segment that is stored in the line segment list 203 and has a finalized flag of "non-finalized" (line segment with line segment number "2") as a first elemental line segment and searches for a connection relationship with another line segment for the coordinates (1,2) of the first terminal point of the first elemental line segment. The line segments targeted for the determination of a connection relationship are the pieces of line segment data for which the finalized flag is "non-finalized" in the line segment list 203. The comparison of coordinates is performed in order from the top of the line segment list 203. The above coordinates are identical to the coordinates (1,2) of the second terminal point of line segment number "5". Accordingly, the connection search unit 103 determines that the line segments with line segment number "2" and line segment number "5" are connected and extracts the line segment with line segment number "5" as a second elemental line segment.

Next, the connection search unit 103 searches for coordinates that are the same as the coordinates (1,4) of the other terminal point, i.e. the first terminal point, of line segment number "5" extracted as the second elemental line segment. These coordinates are identical to the coordinates (1,4) of the second terminal point of line segment number "6". Accordingly, the connection search unit 103 determines that the line segments with line segment number "5" and line segment number "6" are connected and extracts the line segment with line segment number "6" as a third elemental line segment.

The connection search unit 103 then searches for coordinates that are the same as the coordinates (0,3) of the other terminal point, i.e. the first terminal point, of line segment number "6" extracted as the third elemental line segment. These coordinates are identical to the coordinates (0,3) of the second terminal point of line segment number "2". Accordingly, the connection search unit 103 determines that the line segments with line segment number "6" and line segment number "2" are connected. When the coordinates match a terminal point of any previously extracted elemental line segment, or when the coordinates do not match any terminal point in the line segment list, the connection search unit 103 stops searching for a connection for the line segment. Therefore, in this example, since the coordinates of the first terminal point of the third elemental line segment (line segment number "6") match the coordinates of the second terminal point of the previously extracted first elemental line segment (line segment number "2"), the connection search unit 103 now stops searching for a connection.

Next, the confined space determination control unit 104 determines whether a combination of line segments for which a connection was determined to exist forms an confined space (step S14). In the present example, the starting connection point of the first elemental line segment (line segment number "2") for which the connection search unit 103 started the determination is (1,2). The coordinates for which the connection searching ended are those of the other terminal point (0,3) of the line segment number "2". Accordingly, the confined space determination control unit 104 determines that the combination of the first elemental line segment (line segment number "2"), the second elemental line segment (line segment number "5"), and the third elemental line segment (line segment number "6") forms an confined space, and processing proceeds to step S15.

Figure 6:
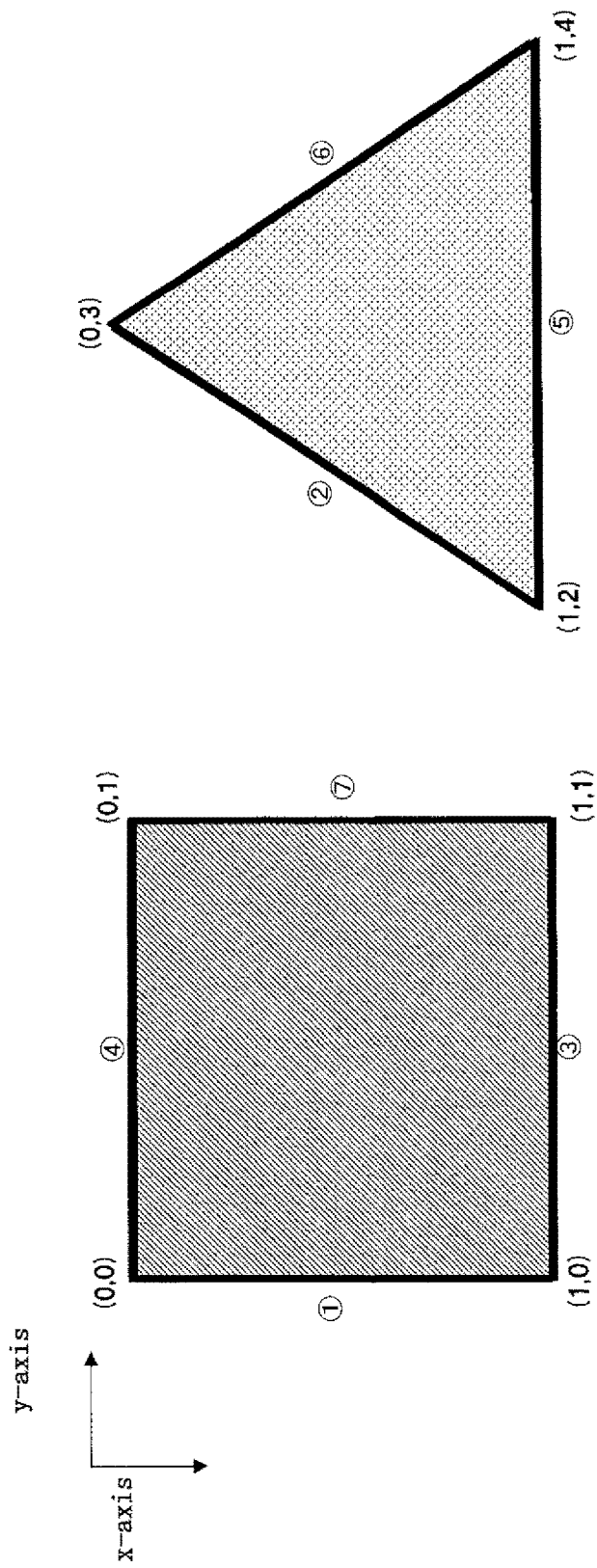
FIG. 6 represents an example of vector data output in Embodiment 1 of the present invention.

The confined space determination control unit 104 then stores the combination of pieces of line segment data determined to form a confined space in the confined space memory 105 (step S15). Specifically, the line segment numbers "2", "5", and "6" are connected in this order as the confined space for fill style "2". The vector data output, which results from the confined space list 204 of FIG. 5, is illustrated in FIG. 6. The confined space list 204 is thus updated so that information on a confined space with a new confined space number "2" is stored in the confined space memory 105, as in the confined space list 205.

For the line segment data pertaining to the confined space, the confined space determination control unit 104 then updates the finalized flag to "finalized" in the line segment list stored in the line segment memory 102 (step S16). In other words, the confined space determination control unit 104 updates the finalized flag to "finalized" for all of the line segment numbers "2", "5", and "6".

The connection search unit 103 then refers to the finalized flags in the line segment list stored the line segment memory 102 to determine whether all of the finalized flags are set to "finalized" (step S17). In the present example, processing proceeds to the next step, since all of the line segments are finalized.

The vector data output unit 106 then outputs vector data based on the confined space memory 105 (step S18). The vector data output unit 106 can easily output this data because the data in the confined space memory 105 is in standard vector data format, i.e. data for a plurality of line segments forming an confined space and data for the fill style of the confined space. Here, output of vector data is a concept referring to transmission of vector data to a device including a display, to a reception unit, or to memory. The device or reception unit receiving the vector data can easily interpret the vector data and display an image on a display or the like.

FIG. 6 illustrates display examples when the images constituted by the above vector data are output to a display or the like. FIG. 6 illustrates the display of a confined space formed by line segment numbers "1", "3", "7", and "4" and a confined space formed by line segment numbers "2", "5", and "6", each filled with a predetermined fill style.

1.2.2 Output Operations of Vector Data Conversion Output Device 10 for SWF Vector Data in FIG. 7

Next, an example is described in which the vector data conversion output device 10 retrieves SWF vector data 211 illustrated in FIG. 7 and outputs converted vector data.

First, the vector data retrieving unit 101 retrieves the SWF format vector data illustrated in FIG. 7 (step S11).

Next, the vector data conversion output device 10 classifies the line segment data in the retrieved SWF format vector data by fill style and stores the line segment data in the line segment memory 102 for each fill style (step S12).

FIG. 8 illustrates a line segment list 212 stored in the line segment memory 102. In the present example, as illustrated in FIG. 8, only the line segment list 212 for fill style "1" is stored in the line segment memory 102.

The connection search unit 103 then searches for connection relationships between line segments in the line segment list 212 (step S13). The search starts from the first terminal point (1,0) of line segment number "1" (first elemental line segment). The search method is the same as the method illustrated in FIG. 4, and therefore a description is omitted here. As a result, the connection search unit 103 determines that line segment numbers "1", "2", "3", and "4" are connected in this order.

Next, the confined space determination control unit 104 determines whether the combination of line segments forms an confined space (step S14). In the present example, the starting connection point of the first elemental line segment (line segment number "1") for which the connection search unit 103 started the determination is (1,0). The coordinates for which the determination ended are those of the other terminal point (0,0) of the line segment number "1". Accordingly, the confined space determination control unit 104 determines that the combination of the line segment numbers "1", "2", "3", and "4" forms an confined space, and processing proceeds to step S15.

Figures 9, 10:
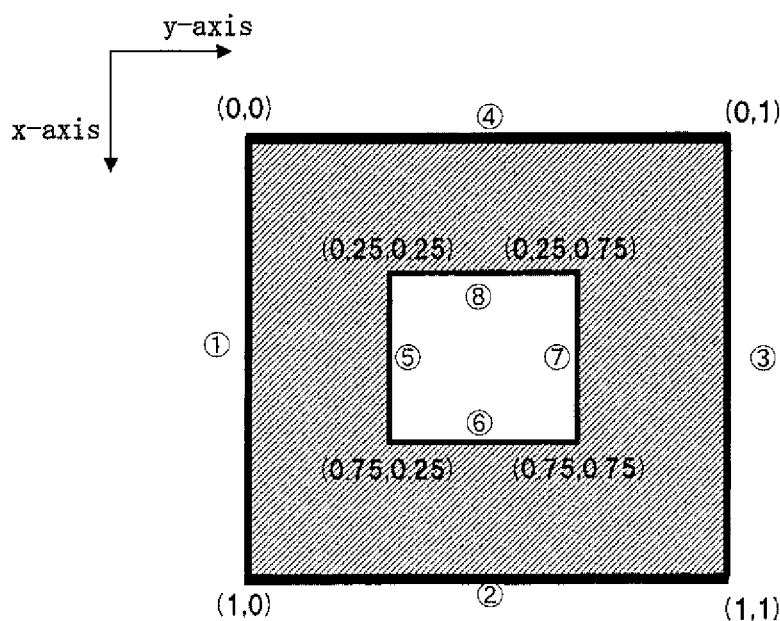
FIG. 9 illustrates confined space lists in Embodiment 1 of the present invention.
FIG. 10 represents an example of vector data output in Embodiment 1 of the present invention.

The confined space determination control unit 104 then stores the combination of pieces of line segment data determined to form an confined space in the confined space memory 105 (step S15). Specifically, the fact that the line segment numbers "1", "2", "3", and "4" are connected in this order as the confined space for fill style "1" is stored in the confined space memory 105. FIG. 9 illustrates an confined space list 213 stored in this way.

For the line segment data pertaining to the confined space, the confined space determination control unit 104 then updates the finalized flag to "finalized" in the line segment list stored in the line segment memory 102 (step S16). In other words, the confined space determination control unit 104 updates the finalized flag to "finalized" for all of the line segment numbers "1", "2", "3", and "4".

The connection search unit 103 then refers to the finalized flags in the line segment list stored the line segment memory 102 to determine whether all of the finalized flags are set to "finalized" (step S17). In the present example, there are non-finalized line segments, and therefore processing proceeds to step S13.

The connection search unit 103 then searches for connection relationships between line segments in the line segment list 212 (step S13). Since the finalized flag for the line segments from line segment number "1" to line segment number "4" is "finalized", line segment number "5" is selected as a new first elemental line segment, and connection searching starts at the first terminal point (0.75,0.25) of the first elemental line segment. The determination method is the same as the method illustrated in FIG. 4, and therefore a description is omitted here. As a result, the connection search unit 103 determines that line segment numbers "5", "6", "7", and "8" are connected in this order.

Next, the confined space determination control unit 104 determines whether a combination of line segments for which a connection was determined to exist forms an confined space (step S14). In the present example, the starting connection point of the first elemental line segment (line segment number "5") for which the connection search unit 103 started the determination is (0.75,0.25). The coordinates for which the determination ended are those of the other terminal point (0.25,0.25) of the line segment number "5". Accordingly, the confined space determination control unit 104 determines that the combination of the line segment numbers "5", "6", "7", and "8" forms an confined space, and processing proceeds to step S15.

The confined space determination control unit 104 then stores the combination of pieces of line segment data determined to form an confined space in the confined space memory 105 (step S15). Specifically, the fact that the line segment numbers "5", "6", "7", and "8" are connected in this order as the confined space for fill style "1" is stored in the confined space memory 105. FIG. 9 illustrates how the confined space list 213 is updated with information on the new confined space and stored as an confined space list 214.

For the line segment data pertaining to the confined space, the confined space determination control unit 104 then updates the finalized flag to "finalized" in the line segment list stored in the line segment memory 102 (step S16). In other words, the confined space determination control unit 104 updates the finalized flag to "finalized" for all of the line segment numbers "5", "6", "7", and "8".

The connection search unit 103 then refers to the finalized flags in the line segment list stored the line segment memory 102 to determine whether all of the finalized flags are set to "finalized" (step S17). Since all are finalized, processing proceeds to the next step.

The vector data output unit 106 then outputs vector data based on the confined space memory 105 (step S18). The vector data output unit 106 combines the fill styles of overlapping portions of confined spaces by exclusive or. Specifically, the confined space with confined space number "1" entirely contains the confined space with confined space number "2". Accordingly, for the confined space with confined space number "2", the fill style is specified twice, by confined space number "1" and by confined space number "2". In this case, the vector data output unit 106 combines the fill styles by exclusive or. In other words, when the fill styles are the same value, image output processing is performed with a fill style of "0", i.e. transparent, for the confined space.

FIG. 10 illustrates a display example when an image constituted by the vector data output by the vector data output unit 106 is displayed on a display or the like. As illustrated in FIG. 10, the confined space with confined space number "2" is transparent, i.e. the confined space is not colored.

(1.3) Effects of Embodiment 1 of the Invention

According to the present invention, the connection search unit 103 searches for connection relationships between line segments forming SWF format vector data, the vector data is converted to standard vector data, and the converted vector data is output. Therefore, even an electronic device not equipped with FLASH playback software can display an image formed by SWF format vector data.

(1.4) Modifications

In Embodiment 1, an example of establishing a color for filling an confined space as the fill style was illustrated, yet the fill style is not limited to a color. The fill style may be of any type as long as it specifies the style for filling the confined space. For example, the confined space may be filled with a pattern, a gradation of a predetermined color, or the like.

Note that in the present embodiment, line segment data has been described as being specified by two terminal points, yet line segment data is not limited in this way and may be a curve. In the case of a curve, each line segment requires a point serving as a standard for the curve, in addition to the two terminal points. Nevertheless, searching for a connection for the two terminal points does not differ in this case. Accordingly, the present vector data conversion output device can be applied not only to straight lines but also to curves.

Embodiment 2

2.1 Structure of Vector Data Conversion Output Device

Figure 11:
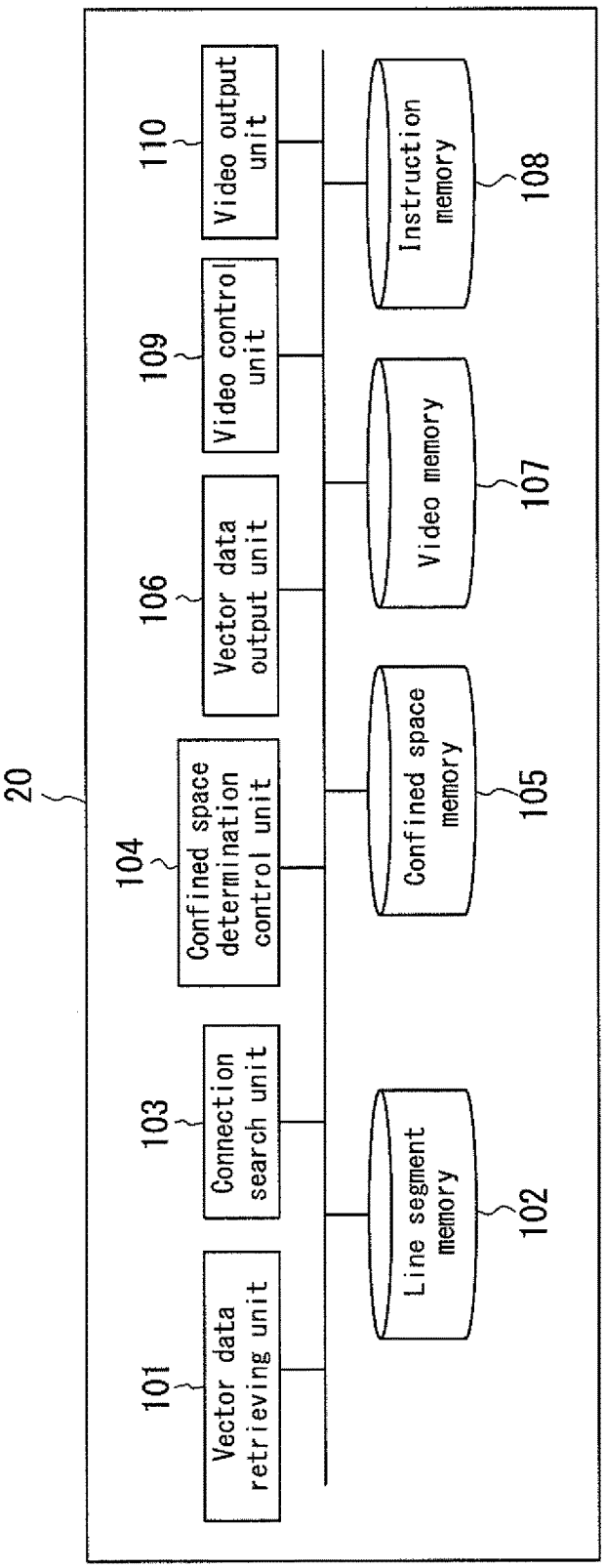
FIG. 11 is a block diagram representing the structure of Embodiment 2 of the present invention.
Figure 12:
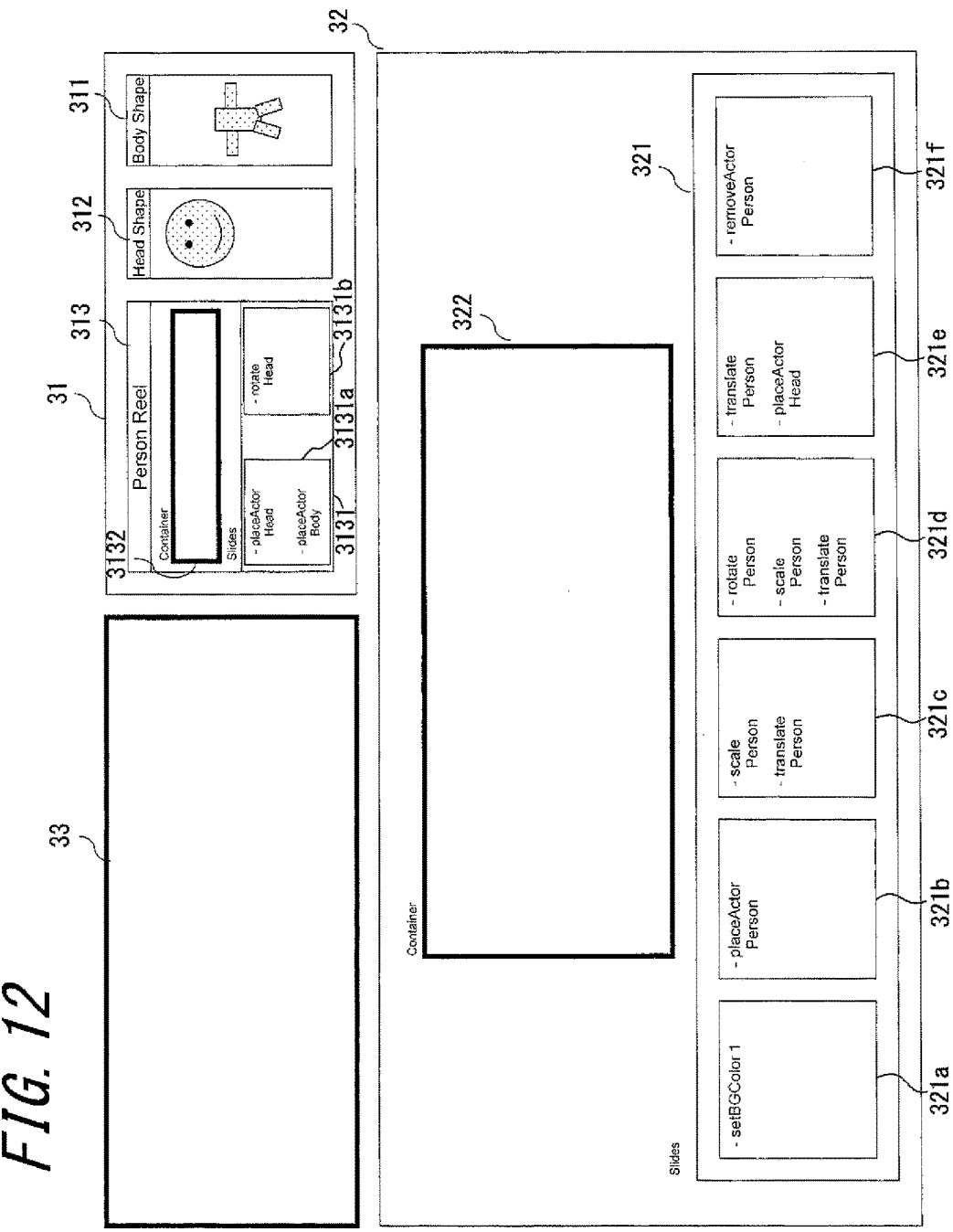
FIG. 12 is a conceptual diagram of video memory in Embodiment 2 of the present invention.

The following describes Embodiment 2 of the present invention. FIG. 11 is a block diagram illustrating the structure of Embodiment 2 of the present invention. Below, structural components that are the same as Embodiment 1 are provided with the same reference signs, and a description thereof is omitted. A vector data conversion output device 20 according to Embodiment 2 differs from the vector data conversion output device 10 according to Embodiment 1 by including a video memory 107, an instruction memory 108, a video control unit 109, and a video output unit 110. A plurality of image elements constituting vector data is stored in the video memory 107. This vector data may be the vector data output by the vector data output unit 106 yet is not limited thereto. As long as this vector data is vector data in the above-described standard format, the vector data may be output by a unit other than the vector data output unit 106 or may be data stored in advance. FIG. 12 is a conceptual diagram of information stored in the video memory 107.

The video memory 107 includes a library 31, a main reel 32, and a projector 33.

The library 31 is a memory area in which image elements (referred to below as "shapes") constituting vector data are stored. An image element is a small piece of vector data (segment) obtained by dividing up the entire vector data. A sub-reel 313 is also stored in the library 31. Shapes and the sub-reel 313 are referred to as "actors". An confined space may, for example, be treated as one shape, or a combination of two or more confined spaces may be treated as one shape.

Shape 311 and shape 312 are respectively a shape representing the body of a human figure and a shape representing the head of a human figure. The shape 311 and the shape 312 may be actors in the main reel 32 or actors in the sub-reel 313. The sub-reel 313 has the same structure as the below-described main reel 32 and is formed by a combination of instructions for shapes and a storage area for placement of shapes. Note that the image formed by the shapes is merely an example. Shapes may of course form an image other than a human figure. Furthermore, the range of shapes may be freely set. In the present example, a human figure is formed by two shapes: a shape representing a body, and a shape representing a head. A human figure is not, however, limited in this way. For example, a human figure may be specified by one shape that includes both a body section and a head section. The body section may also be divided up, for example, so that a body image is specified by a shape representing arms, a shape representing a torso, and a shape representing legs.

The main reel 32 is a memory area storing the placement of a combination of actors. The main reel 32 includes a slide area 321 and a container 322.

The slide area 321 is a memory area storing instructions in chronological order for placement, translation, rotation, scaling, and the like. Six slides (slides 321a, 321b, 321c, 321d, 321e, and 321f) are stored in the slide area 321 illustrated in FIG. 12. Supposing, for example, that the frame rate is 1 fps, from the left these six slides indicate instructions that are performed on the actors at the times of 0 seconds, 1 second, 2 seconds, 3 seconds, 4 seconds, and 5 seconds. The actors positioned in the container 322 are translated, rotated, and scaled in accordance with these instructions so as to render the image constituted by the vector data designated for each point in time, thereby allowing for output of video.

The container 322 is a memory area for placement of actors retrieved from the library 31 in accordance with instructions stored in the slide 321.

The sub-reel 313 has a similar structure to the main reel 32 and includes a slide area 3131 and a container 3132. The container 3132 of the sub-reel is placed in the container 322 of the main reel 32. The sub-reel 313 stores instructions for the actors in the slide area 3131 in advance. Slides for the sub-reel 313 (slide 3131a and slide 3131b) are placed in the slide area 3131. The same frame rate (for example, 1 fps) as the frame rate set for the slides in the slide area 321 of the main reel 32 is preferably set for these two slides. With such a setting, the slide area 321 of the main reel 32 and the slide area 3131 of the sub-reel 313 are synchronized, and instructions listed in the corresponding slides are executed at the same time. While details are provided below, upon the sub-reel 313 being called in the slide 321b of the main reel, for example, the slide 321b of the main reel and the slide 3131a of the sub-reel are synchronized, and the slide 321c of the main reel and the slide 3131b of the sub-reel are synchronized. Listing instructions in the sub-reel 313 in this way allows for easy processing of actors that perform typical animation. Below, the slide area 321 of the main reel 32 and the slide area 3131 of the sub-reel 313 are described as being synchronized, yet this example is not limiting. Different frame rates may be set for the slide area 321 of the main reel 32 and the slide area 3131 of the sub-reel 313.

The projector 33 is a memory area storing a copy of the container 322 of the main reel 32. The video output unit 110 uses this memory area.

Instructions for the slides in the main reel 32 and the sub-reel 313 are stored consecutively in the instruction memory 108.

The video control unit 109 controls the rendered image by translating, rotating, and scaling (expanding or contracting) the actors. In other words, the video control unit 109 controls the information in the video memory 107 in accordance with the instructions stored in the instruction memory 108. The video control unit 109 also performs a variety of control related to video output for the vector data conversion output device 20.

At predetermined time intervals, the video output unit 110 outputs, as video, vector data that combines a plurality of translated, rotated, and scaled actors. Specifically, the video output unit 110 outputs video information rendered by storage in the projector 33 of the video memory 107.

(2.2) Output Operations for Video

Figure 13:
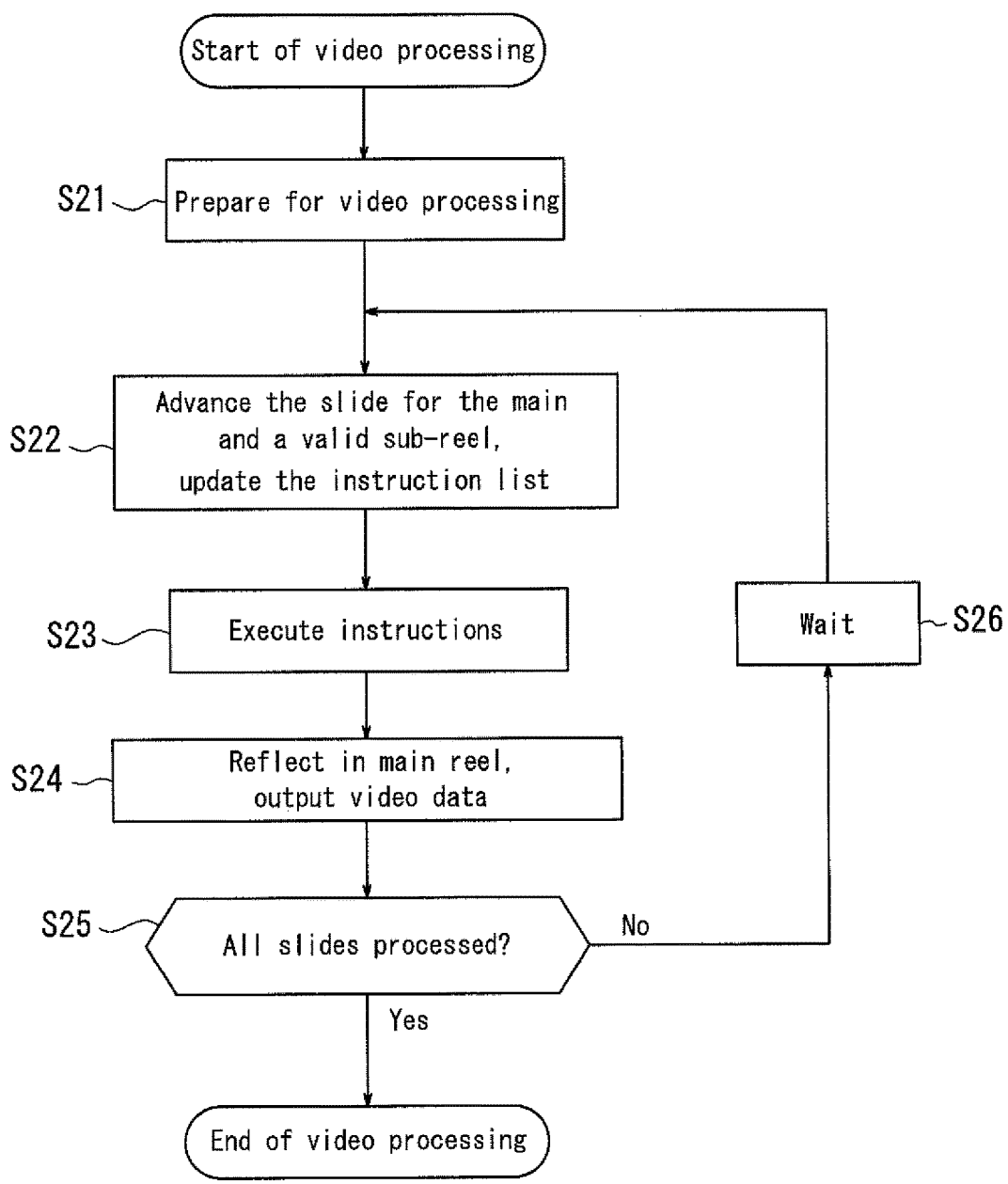
FIG. 13 is a flowchart representing operations of Embodiment 2 of the present invention.
Figure 14:
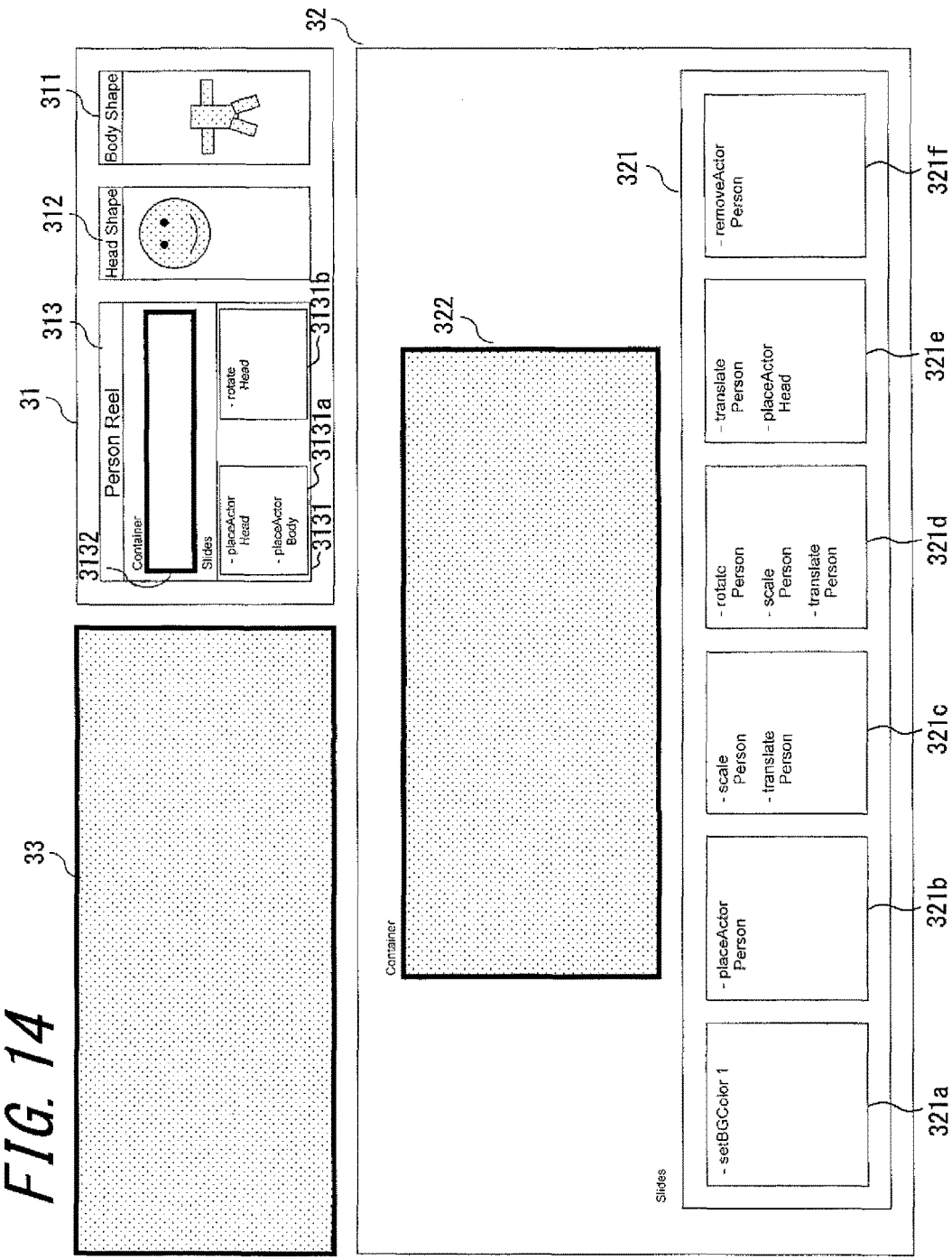
FIG. 14 is a conceptual diagram of video memory in Embodiment 2 of the present invention.
Figure 15:
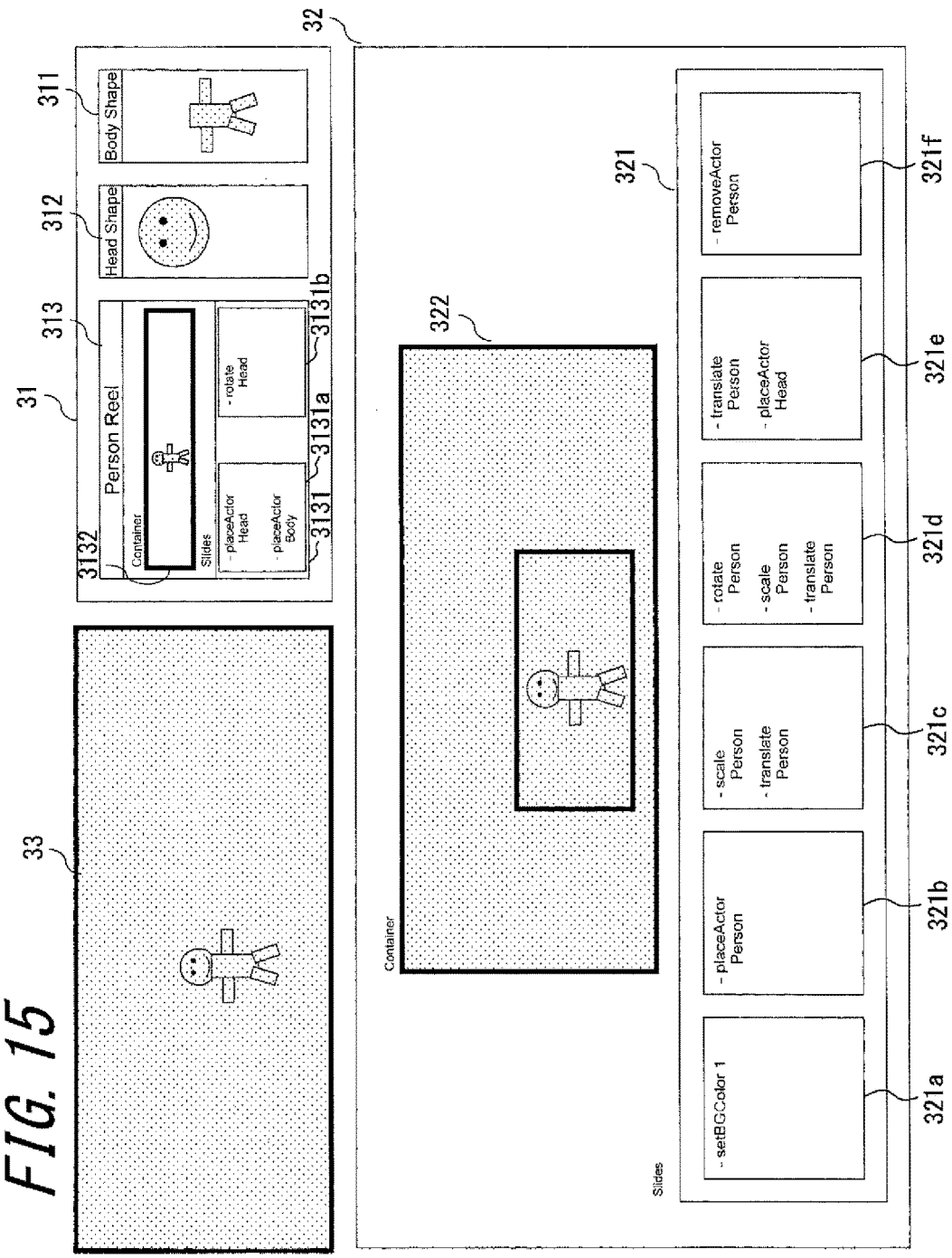
FIG. 15 is a conceptual diagram of video memory in Embodiment 2 of the present invention.

FIG. 13 is a flowchart representing operations of the vector data conversion output device 20 according to Embodiment 2 of the present invention. FIGS. 14 through 19 are conceptual diagrams of the video memory 107 at the time of operation of the vector data conversion output device 20. Below, operations are described in accordance with the conceptual diagrams of the video memory 107 and the flowchart.

First, the video control unit 109 prepares for video processing (step S21). At this point, all of the vector data and instructions necessary for video are stored in the video memory 107. In other words, all data necessary for video processing is stored in the library 31 and the slide area 321 of the main reel 32. The conceptual diagram of the video memory 107 in FIG. 12 illustrates an example in which these pieces of information are stored.

Next, the video control unit 109 advances the slide for the main reel 32 and a valid sub-reel 313 in the video memory 107 and updates the instruction list (step S22). In other words, the video control unit 109 stores, in the instruction memory 108, the instruction listed in the slide 321a that is stored in the slide area 321. In accordance with the conceptual diagram of the video memory 107 illustrated in FIG. 12, the instruction "setBGColor 1" is stored. This instruction is for setting the background color of the container 322 to "1".

The video control unit 109 then executes the instruction stored in the instruction memory 108 (step S23). In other words, the instruction "setBGColor 1" is executed, setting the background color to "1". Note that the executed instruction is deleted from the instruction list 108 after execution.

The video control unit 109 then reflects the result of the instruction in the main reel 32 (step S24). In other words, the instruction result is stored in the container 322 of the main reel 32. In this case, as a result of executing the instruction to set the background color to "1", the background color of the container 322 in FIG. 14 changes. Since the projector 33 is a copy of the container 322, the background color of the projector 33 changes in the same way.

The video output unit 110 displays the image rendered in the projector 33 on a display or the like (not illustrated).

The video control unit 109 then determines whether the next slide exists (step S25). Since there are still five more slides in the present example, the video control unit 109 determines negatively.

The video control unit 109 then waits for a predetermined amount of time before moving to the next slide (step S26). The amount of time to wait is set appropriately according to the frame rate. In the present example, the frame rate is described as being 1 fps. In other words, the instructions for slides are executed once per second.

Next, the video control unit 109 advances the slide and updates the instruction list (step S22). In other words, the video control unit 109 stores, in the instruction list 108, the instruction listed in the slide 321b that is stored in the slide area 321 of the main reel 32. In accordance with the conceptual diagram of the video memory 107 illustrated in FIG. 14, the instruction "place Actor Person" is stored. This instruction is for placing the container 3132 for the actor "Person" of the library 31 into the container 322. In this case, since the actor "Person" is stored in the library 31 as the sub-reel 313, the instructions in the slides stored in the sub-reel 313 are also stored in the instruction list 108. In other words, the instructions "place Actor head" and "place Actor body" listed in the slide 3131a are stored in the instruction list. These instructions are respectively for placing the actor "head" (shape 312) and the actor "body" (shape 311) in the container 3132. In this way, the slide area 321 of the main reel 32 and the slide area 3131 of the sub-reel 313 are synchronized, and instructions listed in the slides are executed at the same time.

The video control unit 109 then executes the instructions stored in the instruction list 108 (step S23). In other words, the instructions "place Actor Person", "place Actor head", and "place Actor body" are executed. Note that the placement positions can be included in the instructions.

The video control unit 109 then renders the result of the instructions in the main reel 32 (step S24). In this case, as a result of executing the above instructions, the shape 311 representing the body of a human figure and the shape 312 representing the head of a human figure are placed in the container 3132 of the sub-reel 313 in FIG. 15, and the container 3132 is placed in the container 322 of the main reel 32. As a result, the actors are placed in the container 322, and a human figure is rendered. Since the projector 33 is a copy of the container 322, the human figure is rendered in the projector 33 in the same way.

The video output unit 110 displays the image rendered in the projector 33 on a display or the like (not illustrated).

The video control unit 109 then determines whether the next slide exists (step S25). Since there are still four more slides in the present example, the video control unit 109 determines negatively.

The video control unit 109 then waits for a predetermined amount of time before moving to the next slide (step S26).

Next, the video control unit 109 advances the slide and updates the instruction list (step S22). In other words, the video control unit 109 stores, in the instruction list 108, the instructions listed in the slide 321c that is stored in the slide area 321 of the main reel 32. The video control unit 109 also advances the slide of the sub-reel 313 and updates the instruction list. Specifically, the video control unit 109 stores, in the instruction list 108, the instruction listed in the slide 3131b of the slide area 3131. In accordance with the conceptual diagram in FIG. 15, the instructions "scale Person" and "translate Person" listed in the third slide of the main reel 32 (slide 321c) are stored. These instructions are respectively for expanding and translating the actor "Person" (sub-reel 313; more specifically, the human figure constituted by the shape 311 and the shape 312 placed in the container 3132) placed in the container 322. The instruction in the second slide stored in the sub-reel 313 is also stored in the instruction list 108. In other words, the instruction "rotate head" is stored in the instruction list. This instruction is for rotating and placing the actor "head" (shape 312) in the library 31.

The video control unit 109 then executes the instructions stored in the instruction list 108 (step S23). In other words, the instructions "scale Person", "translate Person" and "rotate head" are executed.

Figure 16:
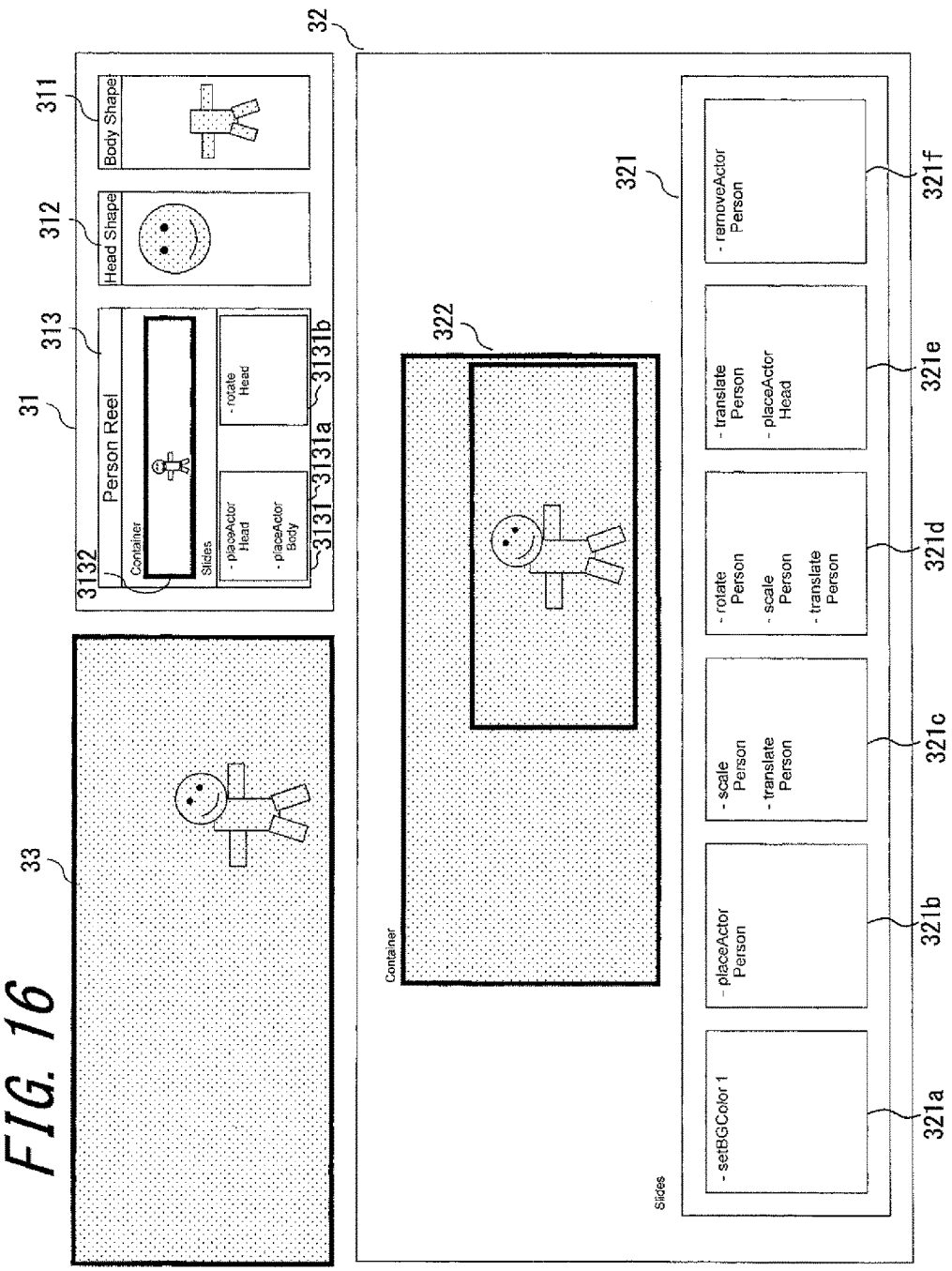
FIG. 16 is a conceptual diagram of video memory in Embodiment 2 of the present invention.

The video control unit 109 then reflects the result of the instructions in the main reel 32 (step S24). As a result of executing these instructions, as illustrated in FIG. 16, an image is rendered in which the entire human figure in the container 322 is modified in size (expanded in this case) and translated to the right, and the head section is rotated. Since the projector 33 is a copy of the container 322, the human figure is rendered in the projector 33 in the same way. The ratio for modifying the size of the entire image can be included in the "scale Person" instruction. Furthermore, the translation direction and translation amount can be included in the "translate Person" instruction. Finally, the rotation direction and rotation amount can be included in the "rotate head" instruction.

The video output unit 110 displays the image rendered in the projector 33 on a display or the like (not illustrated).

The video control unit 109 then determines whether the next slide exists (step S25). Since there are still three more slides in the present example, the video control unit 109 determines negatively.

The video control unit 109 then waits for a predetermined amount of time before moving to the next slide (step S26).

Next, the video control unit 109 advances the slide and updates the instruction list (step S22). In other words, the video control unit 109 stores, in the instruction list 108, the instructions listed in the slide 321d that is stored in the slide area 321 of the main reel 32. Since the sub-reel 313 ends at the second slide, there are no more instructions for the sub-reel 313. Therefore, in accordance with the conceptual diagram in FIG. 16, the instructions "rotate Person", "scale Person", and "translate Person" are stored. These instructions are respectively for rotating, expanding, and translating the actor "Person" (sub-reel 313) placed in the container 322.

The video control unit 109 then executes the instructions stored in the instruction list 108 (step S23). In other words, the instructions "rotate Person", "scale Person" and "translate Person" are executed.

Figure 17:
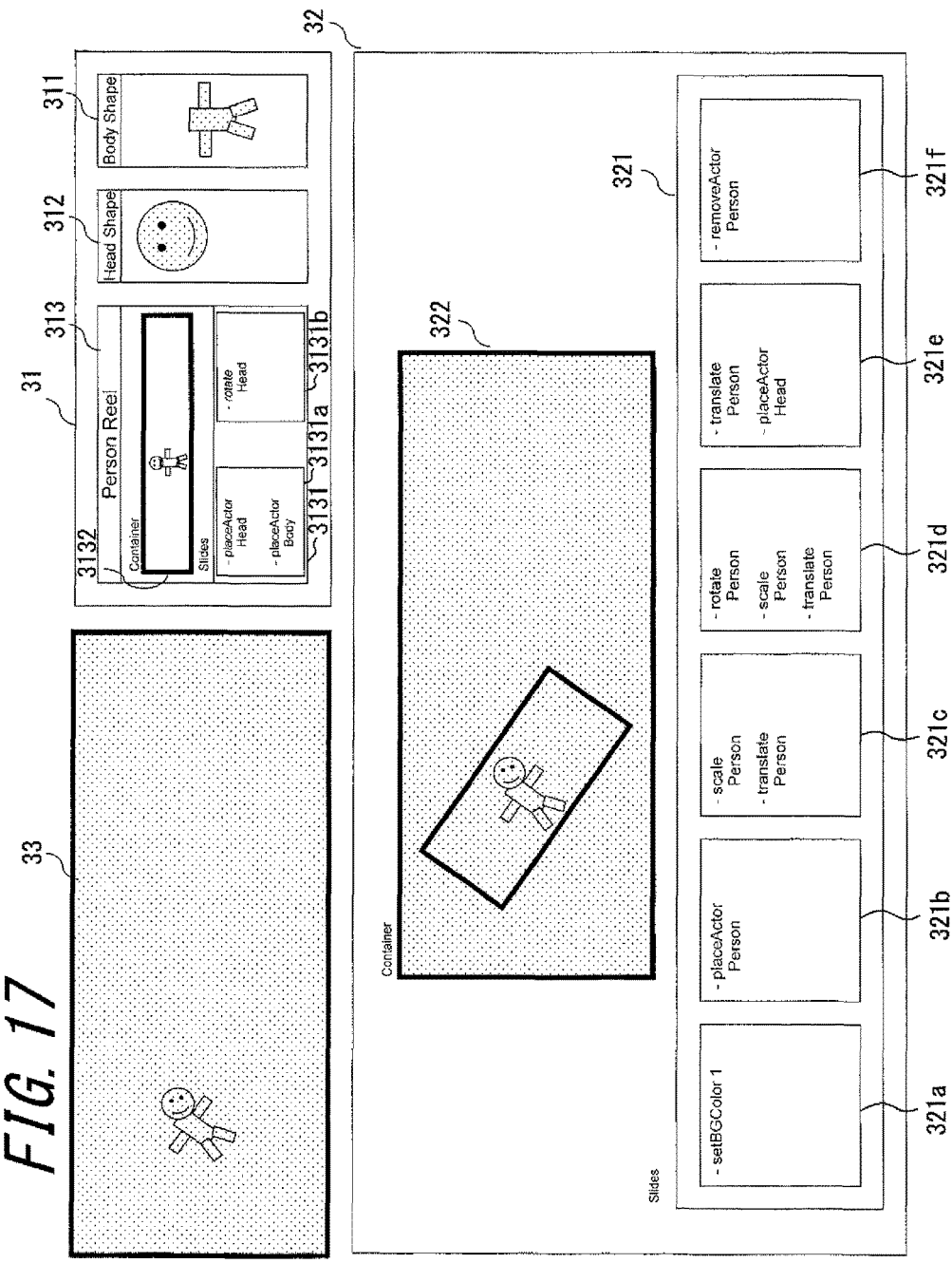
FIG. 17 is a conceptual diagram of video memory in Embodiment 2 of the present invention.

The video control unit 109 then reflects the result of the instructions in the main reel 32 (step S24). As a result of executing these instructions, as illustrated in FIG. 17, an image is rendered in which the entire human figure in the container 322 is rotated, modified in size (contracted in this case), and translated to the upper left. Since the projector 33 is a copy of the container 322, the human figure is rendered in the projector 33 in the same way.

The video output unit 110 displays the image rendered in the projector 33 on a display or the like (not illustrated).

The video control unit 109 then determines whether the next slide exists (step S25). Since there are still two more slides in the present example, the video control unit 109 determines negatively.

The video control unit 109 then waits for a predetermined amount of time before moving to the next slide (step S26).

Next, the video control unit 109 advances the slide and updates the instruction list (step S22). In other words, the video control unit 109 stores, in the instruction list 108, the instructions listed in the slide 321e that is stored in the slide area 321 of the main reel 32. Therefore, in accordance with the conceptual diagram in FIG. 17, the instructions "translate Person" and "placeActor Head" are stored. These instructions are respectively for translating the actor "Person" (sub-reel 313) placed in the container 322 and for placing the actor "head" (shape 312) from the library 31 in the container 322.

The video control unit 109 then executes the instructions stored in the instruction list 108 (step S23). In other words, the instructions "translate Person" and "placeActor Head" are executed.

Figure 18:
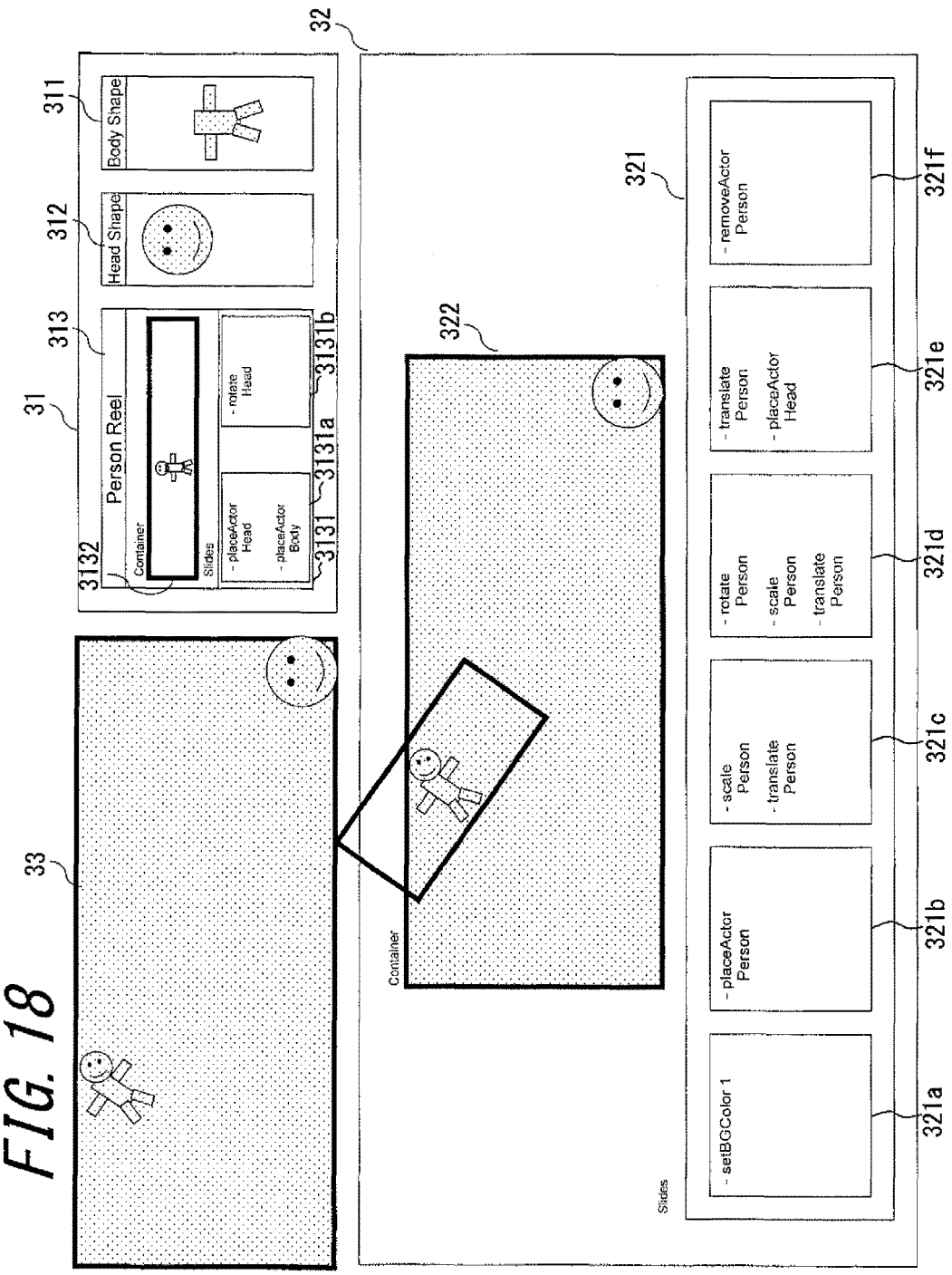
FIG. 18 is a conceptual diagram of video memory in Embodiment 2 of the present invention.

The video control unit 109 then reflects the result of the instructions in the main reel 32 (step S24). In other words, the instruction result is stored in the container 322 of the main reel 32. In this case, as a result of executing the above instructions, the human figure is translated upwards and the human head is rendered in the container 322, as illustrated in FIG. 18. Since the projector 33 is a copy of the container 322, the human figure and the human head are rendered in the projector 33.

The video output unit 110 displays the image rendered in the projector 33 on a display or the like (not illustrated).

The video control unit 109 then determines whether the next slide exists (step S25). Since there is still one more slide in the present example, the video control unit 109 determines negatively.

The video control unit 109 then waits for a predetermined amount of time before moving to the next slide (step S26).

Next, the video control unit 109 advances the slide and updates the instruction list (step S22). In other words, the video control unit 109 stores, in the instruction list 108, the instruction listed in the slide 321f that is stored in the slide area 321. Therefore, in accordance with the conceptual diagram in FIG. 18, the instruction "removeActor Person" is stored. This instruction is for removing the actor "Person" (sub-reel 313) placed in the container 322.

The video control unit 109 then executes the instruction stored in the instruction list 108 (step S23). In other words, the instruction "removeActor Person" is executed.

The video control unit 109 then reflects the result of the instruction in the main reel 32 (step S24). In this case, as a result of executing the above instruction, the human figure is removed from the container 322, leaving only the human head.

The video output unit 110 displays the image rendered in the projector 33 on a display or the like (not illustrated).

The video control unit 109 then determines whether the next slide exists (step S25). Since there are no more slides in the present example, the video control unit 109 determines affirmatively, and processing terminates.

(2.3) Effects of Embodiment 2 of the Invention

In this way, the vector data conversion output device 20 of Embodiment 2 divides the vector data into its constituent image elements (vector data segments) for storage in the video memory 107 and places the image elements at predetermined times. The placed image elements are translated, rotated, and scaled at predetermined times in order to construct and output images. Therefore, among the image elements constituting vector data, it is unnecessary to store moving image elements (for example, image elements that are translated, rotated, or scaled) again in the video memory 107 each time the video frame is updated. As compared to the processing for storage of vector data in the video memory 107, the processing load for placing, translating, rotating, and scaling image elements is extremely low. Therefore, the processing load placed on a vector data conversion output device in order to output vector data can be dramatically reduced, and the speed for outputting images and video can be dramatically improved. Since all of the image elements are first stored in the video memory 107, a large memory capacity is required at the start of processing, making this approach particularly useful for mobile phones or the like that have a CPU with a low processing ability yet have a large memory capacity.

(2.3) Modifications

The video memory 107 in Embodiment 2 is provided with a main reel 32 and a sub-reel 313, yet the video memory 107 is not limited in this way. In other words, the sub-reel may have a hierarchical structure including a sub-sub-reel. Storing instructions for the actors in the library 31 in advance as a sub reel and a sub-sub-reel in this way allows for efficient execution of instructions for the actors.

Although the present invention has been described by way of drawings and embodiments, it is to be noted that various changes and modifications will be apparent to those skilled in the art based on the present disclosure. Therefore, such changes and modifications are to be understood as included within the scope of the present invention. For example, the functions and the like included in the various members, units, steps, and the like may be reordered in any logically consistent way. Furthermore, units, steps, and the like may be combined into one or divided.

REFERENCE SIGNS LIST

10: Vector data conversion output device
20: Vector data conversion output device
31: Library
32: Main reel
33: Projector
101: Vector data retrieving unit
102: Line segment memory
103: Connection search unit
104: Confined space determination control unit
105: Confined space memory
106: Vector data output unit
107: Video memory
108: Instruction memory
109: Video control unit
110: Video output unit
201: SWF vector data
202, 203: Line segment list
204, 205: Confined space list
211: SWF vector data
212: Line segment list
213, 214: Confined space list
311, 312: Shape
313: Sub-reel
321: Slide area
321a, 321b, 321c, 321d, 322e, 322f: Slide
322: Container
3131: Slide area
3131a, 3131b: Slide
3132: Container

The invention claimed is:

1. A vector data conversion output device for retrieving first vector data and outputting converted second vector data, the first vector data comprising a plurality of line segment data, with each line segment data specifying a starting point, an ending point, and the fill styles to the left and right of a line segment, the vector data conversion output device comprising:

a central processing unit (CPU) configured to act as:

a vector data retrieving unit configured to retrieve the first vector data and to classify the plurality of line segment data of the first vector data by fill styles of a plurality of line segments that form the first vector data, and store the plurality of line segment data and the corresponding fill styles in one of a plurality of line segment lists in a line segment memory, each of the plurality of line segment lists including only one type of fill style and the plurality of line segment data that corresponds to the one type of fill style, such that the line segments in each of the plurality of line segment lists is each classified with respect to only one type of fill style, and each of the line segments is stored in association with terminal points including coordinates for a first terminal point and coordinates for a second terminal point;

a connection search unit configured to search for a connection between the terminal points of the plurality of line segments forming the first vector data, searching being performed for each fill style corresponding to the line segments, based on each of the plurality of line segment lists, wherein, for each line segment list, the connection search unit is configured to compare the coordinates of the terminal points of a line segment in a line segment list with coordinates of the terminal points of other line segments included in the line segment list and determine that the line segment is connected to another line segment at a terminal point when the respective coordinates match;

a confined space determination control unit configured to determine whether the plurality of line segments determined by the connection search unit to be connected form a confined space, and when the line segments form a confined space, to store the line segments and the fill style corresponding to the line segments in association with the confined space in a confined space memory;

a vector data output unit configured to output the second vector data based on the line segments and the fill style stored in association with the confined space; and a display configured to display an image constituted by the second vector data.

2. The vector data conversion output device of claim 1, wherein when the confined space determination control unit determines that a plurality of confined spaces are formed, the confined spaces overlap, and the fill styles of the confined spaces are the same, the vector data output unit further outputs a combination, by exclusive or, of the fill styles of overlapping portions of the confined spaces.

3. A vector data conversion output method for retrieving a first vector data and outputting converted second vector data, the first vector data comprising a plurality of line segment data, with each line segment data specifying a starting point, an ending point, and the fill styles to the left and right of a line segment, the vector data conversion output method comprising the steps of:

retrieving the first vector data and classifying the plurality of line segment data of the first vector data by fill styles of a plurality of line segments that form the first vector data, and storing the plurality of line segment data and the corresponding fill styles in one of a plurality of line segment lists in a line segment memory, each of the plurality of line segment lists including only one type of fill style and the plurality of line segment data that corresponds to the one type of fill style, such that the line segments in each of the plurality of line segment lists is each classified with respect to only one type of fill style, and each of the line segments is stored in association with terminal points including coordinates for a first terminal point and coordinates for a second terminal point;

searching for a connection between the terminal points of the plurality of line segments forming the first vector data, the searching being performed for each fill style corresponding to the line segments, based on each of the plurality of line segment lists;

comparing, for each line segment list, the coordinates of the terminal points of a line segment in a line segment list with coordinates of the terminal points of other line segments included in the line segment list, and determining that the line segment is connected to another line segment at a terminal point when the respective coordinates match;

determining whether the plurality of line segments determined in the searching step to be connected form a confined space, and when the line segments form a confined space, storing the line segments and the fill style corresponding to the line segments in association with the confined space in a confined space memory;

outputting the second vector data based on the line segments established for the confined space and the fill style established for the confined space in a confined space memory; and displaying an image constituted by the second vector data.

4. The vector data conversion output method of claim 3, wherein when a plurality of confined spaces are determined to be formed in the determining step, the confined spaces overlap, and the fill styles of the confined spaces are the same, the output step further includes outputting a combination, by exclusive or, of the fill styles of overlapping portions of the confined spaces.

5. A vector data conversion output program product comprising a non-transitory computer-readable medium having a computer program embodied therein, the computer program, when being executed on a central processing unit (CPU), causes the CPU to retrieve a first vector data and output converted second vector data, the first vector data comprising a plurality of line segment data, with each line segment data specifying a starting point, an ending point, and the fill styles to the left and right of a line segment, and to perform the steps of:

retrieving the first vector data and classifying the plurality of line segment data of the first vector data by fill styles of a plurality of line segments that form the first vector data, and storing the plurality of line segment data and the corresponding fill styles in one of a plurality of line segment lists in a line segment memory, each of the plurality of line segment lists including only one type of fill style and the plurality of line segment data that corresponds to the one type of fill style, such that the line segments in each of the plurality of line segment lists is each classified with respect to only one type of fill style, and each of the line segments is stored in association with terminal points including coordinates for a first terminal point and coordinates for a second terminal point;

searching for a connection between the terminal points of the plurality of line segments forming the first vector data, the searching being performed for each fill style corresponding to the line segments, based on each of the plurality of line segment lists;

comparing, for each line segment list, the coordinates of the terminal points of a line segment in a line segment list with coordinates of the terminal points of other line segments included in the line segment list, and determining that the line segment is connected to another line segment at a terminal point when the respective coordinates match;

determining whether the plurality of line segments determined to be connected form a confined space, and when the line segments form a confined space, storing the line segments and the fill style corresponding to the line segments in association with the confined space in a confined space memory;

outputting the second vector data based on the line segments established for the confined space and the fill style established for the confined space; and displaying an image constituted by the second vector data.

6. The vector data conversion output program of claim 5, wherein when a plurality of confined spaces are determined to be formed in the determining step, the confined spaces overlap, and the fill styles of the confined spaces are the same, the output step further includes outputting a combination, by exclusive or, of the fill styles of overlapping portions of the confined spaces.

* * * * *